(12) United States Patent
Gaska

(10) Patent No.: US 12,096,870 B2
(45) Date of Patent: Sep. 24, 2024

(54) LAUNDRY VALET ROD

(71) Applicant: Whitmor, Inc., Southaven, MS (US)

(72) Inventor: Gil Gaska, Germantown, TN (US)

(73) Assignee: Whitmor, Inc., Southaven, MS (US)

( * ) Notice: Subject to any disclaimer, the term of this patent is extended or adjusted under 35 U.S.C. 154(b) by 0 days.

(21) Appl. No.: 17/410,999

(22) Filed: Aug. 24, 2021

(65) Prior Publication Data

US 2021/0378431 A1 Dec. 9, 2021

Related U.S. Application Data

(63) Continuation-in-part of application No. 29/649,698, filed on May 31, 2018, now Pat. No. Des. 929,061.

(51) Int. Cl.
*A47G 25/06* (2006.01)
*A47B 91/02* (2006.01)

(52) U.S. Cl.
CPC ........ *A47G 25/0664* (2013.01); *A47B 91/022* (2013.01); *A47G 25/0692* (2013.01)

(58) Field of Classification Search
CPC ............ A47G 25/0664; A47G 25/0692; A47B 91/02; A47B 91/022; A47B 91/024; A47B 91/026; A47B 91/028
See application file for complete search history.

(56) References Cited

U.S. PATENT DOCUMENTS

| | | | | |
|---|---|---|---|---|
| 3,046,041 A | * | 7/1962 | Gingher | A47B 91/028 403/362 |
| 5,103,984 A | * | 4/1992 | Leyden | A47F 5/0861 211/4 |
| 5,170,898 A | * | 12/1992 | Katz | A47B 57/54 211/193 |
| 5,848,716 A | * | 12/1998 | Waranius | A63B 60/60 211/189 |
| 6,959,824 B1 | * | 11/2005 | Alperson | A47F 5/137 211/1.3 |
| 7,587,917 B2 | * | 9/2009 | Gilboe | D06F 29/00 68/240 |
| 8,020,716 B2 | * | 9/2011 | Vitale | A47B 57/06 211/197 |
| 8,777,025 B1 | * | 7/2014 | Buckleitner | D06F 57/122 211/196 |
| 2006/0118505 A1 | * | 6/2006 | Walter | A47F 5/08 211/190 |
| 2009/0188751 A1 | * | 7/2009 | Gilliam | A62B 35/0068 182/112 |

* cited by examiner

*Primary Examiner* — Ko H Chan
(74) *Attorney, Agent, or Firm* — Stites & Harbison PLLC; Richard S. Myers, Jr.

(57) ABSTRACT

A storage device attachable to a metal surface on an appliance such as a washing machine or clothes dryer, the storage device comprising an elongated support rod with a top end and a bottom end, the top end transitioning into a top arm, the top arm being perpendicular to the support rod; and at least one magnet assembly attached to the support rod, with the magnet assembly comprising at least one magnet and engages the support rod by magnetic attraction.

9 Claims, 10 Drawing Sheets

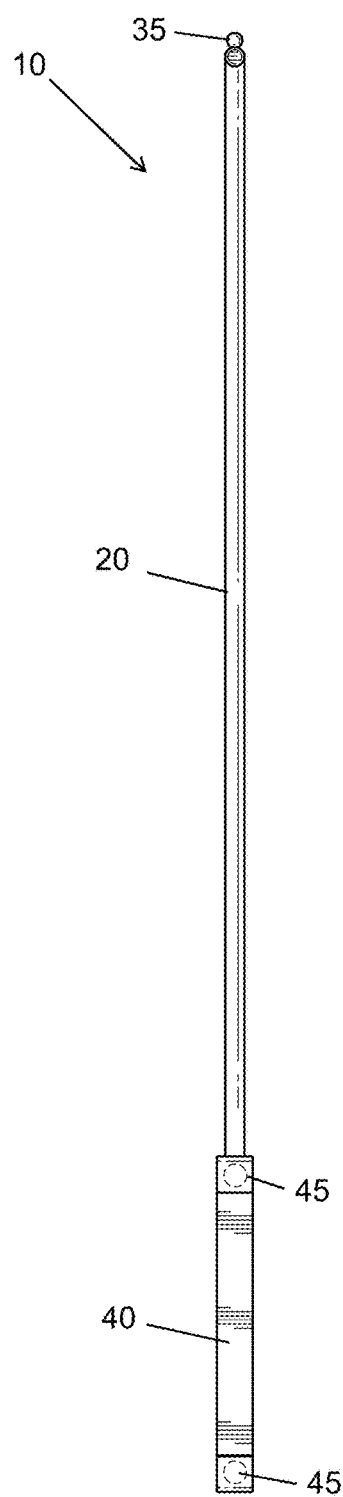
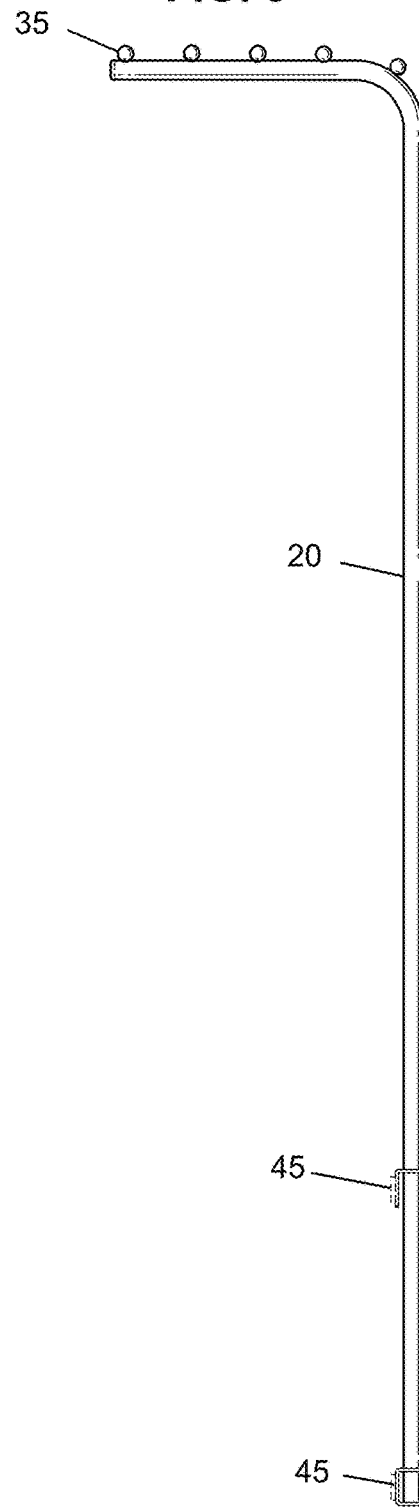
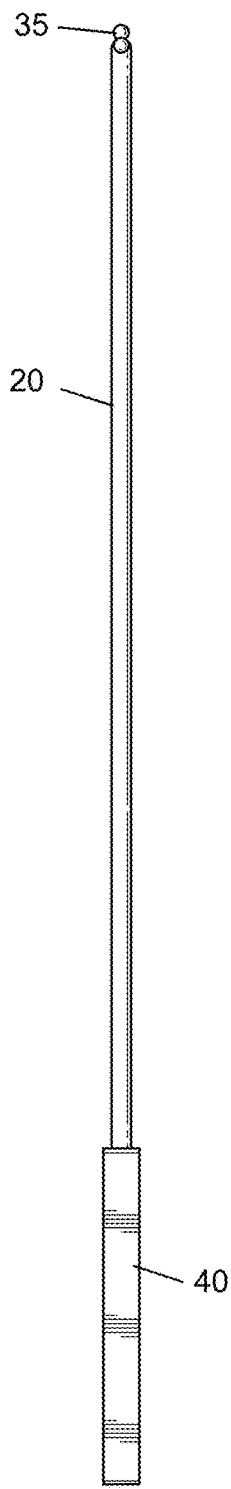

LAUNDRY VALET ROD

PRIOR APPLICATIONS

This application is a continuation in part of U.S. patent application Ser. No. 29/649,698, filed May 31, 2018, now U.S. Pat. No. D929061, the contents of which are incorporated herein by reference.

FIELD OF THE INVENTION

The present invention relates to the field of home organization and home organization products. The present invention also relates to products designed for hanging garments.

BACKGROUND AND SUMMARY OF THE INVENTION

Devices for hanging clothes and like article are known in the art. The present invention presents the advantages of providing such a device that is portable, detachable, and compact.

In one embodiment, the device of the present invention is a support device such as a laundry valet rod that is attachable to a typical family washing machine or dryer. In many instances, family laundry rooms are small and crowded, making space for hanging clothes or other devices at a premium. Because of the manner the valet of the present invention attaches to a washer or dryer, it provides hanging and storage options without taking up much space.

This embodiment easily attaches to a washer or dryer, creating more space for one to hang clothing. Using magnets, this valet connects to the side of a washer or dryer to create a small space solution. Embodiments also include levelers included on the bottom to ensure a secure fit underneath the washer or dryer.

One embodiment of the present invention is a storage device attachable to a metal surface that comprises an elongated support rod with a top end and a bottom end. The top end transitioning into a top arm, and is perpendicular to the support rod. It also includes at least one magnet assembly. The magnet assembly is attached to the support rod and comprises at least one magnet that engages the metal surface by magnetic attraction.

Another embodiment of the present invention is where the magnet assembly is a bracket with two ends, the first end enclosing a first portion of the support rod, and a second end above the first end enclosing a second portion of the rod.

In some embodiments of the present invention, the device comprises first and second magnet assemblies. The first magnet assembly is a bracket enclosing a portion of the support rod, and extending perpendicularly from the rod, and including a magnet on each side of the support rod; and the second magnet assembly engages the support rod below the first magnet assembly.

In other embodiments, the second magnet assembly is a bracket enclosing a portion of the support rod, and extending perpendicularly from the rod, and including a magnet on each side of the support rod.

In another aspect of the invention, the second magnet assembly engages the support pole at the bottom end and includes a brace positioned under the metal surface, at least one leveler that adjusts the height of the brace, and a magnet to engage the metallic surface.

In another aspect of the present invention, the support device has first and second magnet assemblies, with the first magnet assembly engaging the support rod and the metallic surface, and the second magnet assembly engages the support pole at the bottom end and includes a brace positioned under the metal surface, at least one leveler that adjusts the height of the brace, and a magnet to engage the metallic surface.

In some embodiments the support rod is tubular and metallic. Also, in some embodiments, the support rod and top arm are one unitary piece.

In some embodiments, the top arm is a separate piece that attaches to the top of the support arm. For example, the support rod may comprise at least two pieces joined together. Additionally, the support rod may be telescoping to provide an adjustable height.

In one aspect of the invention, the top arm can swivel around the top of the support arm. Also, the top arm may be telescoping to provide an adjustable length.

Other objectives, advantages, and novel features of the invention will become apparent from the following more detailed description when taken in conjunction with the accompanying drawings.

BRIEF DESCRIPTION OF THE DRAWINGS

It should be understood that the drawings are provided for the purpose of illustration only and are not intended to be construed as defining the limits of the invention. The foregoing and other objects and advantages of the embodiments described herein will become apparent with reference to the following and detailed description when taken in conjunction with the accompanying drawings.

FIG. 2 shows a front view of the embodiment of FIG. 1. The side shown here is the side that would be facing toward a washer, dryer, or other metallic surface.

FIG. 3 shows a side view of the embodiment of FIG. 1.

FIG. 4 shows a rear view of the embodiment of FIG. 1. The side shown here is the side that would be facing away from a washer, dryer, or other metallic surface.

DESCRIPTION OF THE INVENTION

Figure 1:
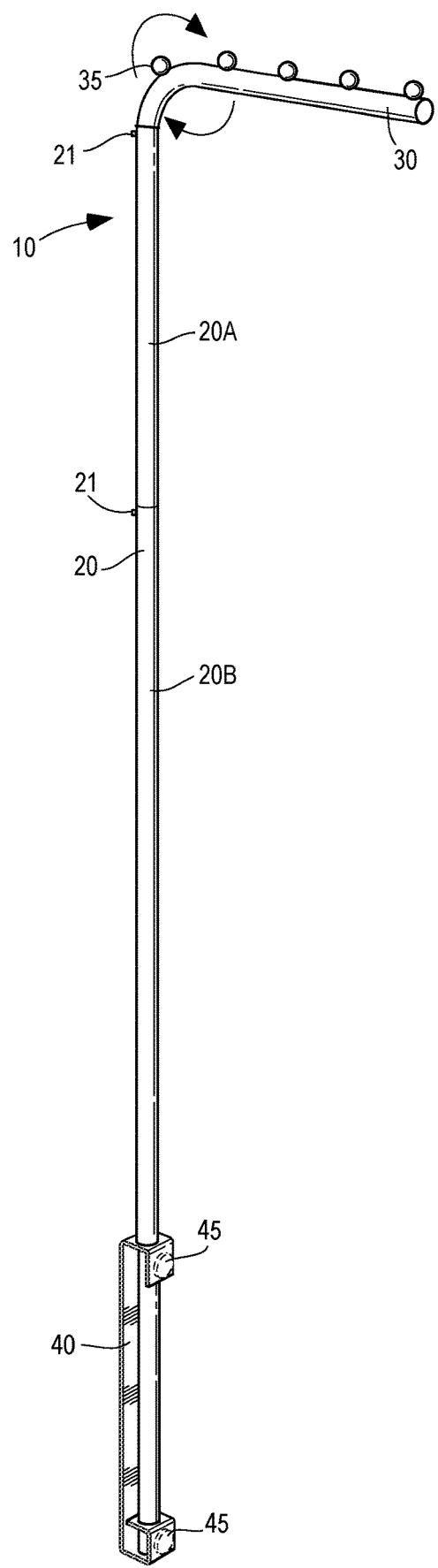
FIG. 1 shows a perspective view of an embodiment of the present invention. This figure shows the elongated support rod, the adjoined top arm, hanger stops on the top arm, the magnet assembly, and a plurality of magnets.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein. It should be noted that references to "an" or "one" embodiment in this disclosure are not necessarily to the same embodiment, and such references mean at least one.

Turning now to the Figures, FIGS. 1-6 show an embodiment of the laundry valet rod 10 of the present invention. This embodiment is comprised of an elongated support rod 20 of a certain height. Additionally, at the top of the support rod 20 is a top arm 30 that extends generally perpendicularly from the rod 20. Clothes and like items can be draped from the top arm 30. To facilitate the use of hangers, the top arm 30 can include hanger stops 35 to prevent the hangers from sliding off of the arm 30.

Because of the attachment mechanisms of this embodiment discussed below, the height can be adjusted by where the rod is placed on the side of a washer, dryer, or other metallic surface. Ideally, the height would be such that clothes and hangers can be placed on the arm 30 and rest above the top surface of the appliance to which it is attached.

In some embodiments, the support rod 20 is polymeric or primarily polymeric. Preferably, the support rod 20 is metal.

In some embodiments, the support rod 20 and the top arm 30 are "one-piece." In this embodiment, the top arm 30 simply bends away from the support rod 20 in a generally perpendicular direction. In other embodiments, there are multiple components that comprises these elements. For example, the arm 20 can be multiple pieces 20A, 20B that fit or snap into one another. In this case, a simple push pin 21 arrangement can be used to hold the various pieces in place. For example, the support rod 20 can be two or three pieces that are assembled or attached to form the unitary rod.

Additionally, to provide more flexibility, the support rod 20 can be telescoping or fixed in height.

In another aspect of the present invention, the top arm 30 can be a separate piece that attaches to the support rod 20. The length of the top arm is not critical. Also, embodiments allow the for the top arm 30 to be telescoping. The telescoping feature can be vertical or horizontal.

When the top arm is a separate piece that attaches to the support rod, aspects of the invention allow it to swivel as well. This allows a use to position the top arm so that the items stored on the top arm can be over the top of the appliance or to the side of the appliance. With this embodiment, the user can position the valet rod at any desired angle in order to make any desired use of space.

The magnet assembly 40 of this embodiment is simply a fixture that receives and secures the rod 20. In FIGS. 1-7, the bracket is at the bottom of the rod 20 so that the rod can also be supported by the fixture. The magnet assembly extends vertically with two magnets 45 generally at the ends of the fixture.

Figure 5:
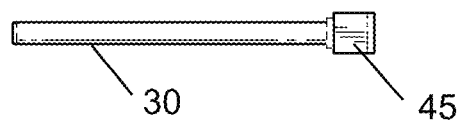
FIG. 5 shows a bottom view of the embodiment of FIG. 1.
Figure 6:
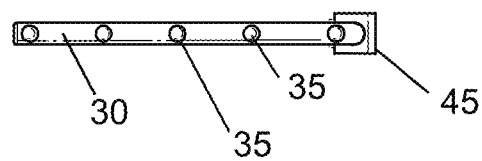
FIG. 6 shows a top view of the embodiment of FIG. 1.

FIGS. 5 and 6 simply show top and bottom views, respectfully, of an embodiment of the present invention. These view show an example of a length of the top arm, and an example of how multiple hanger stops can be positioned on the top arm to prevent excessive movement of hangers or other items along the top arm 30.

Figure 7:
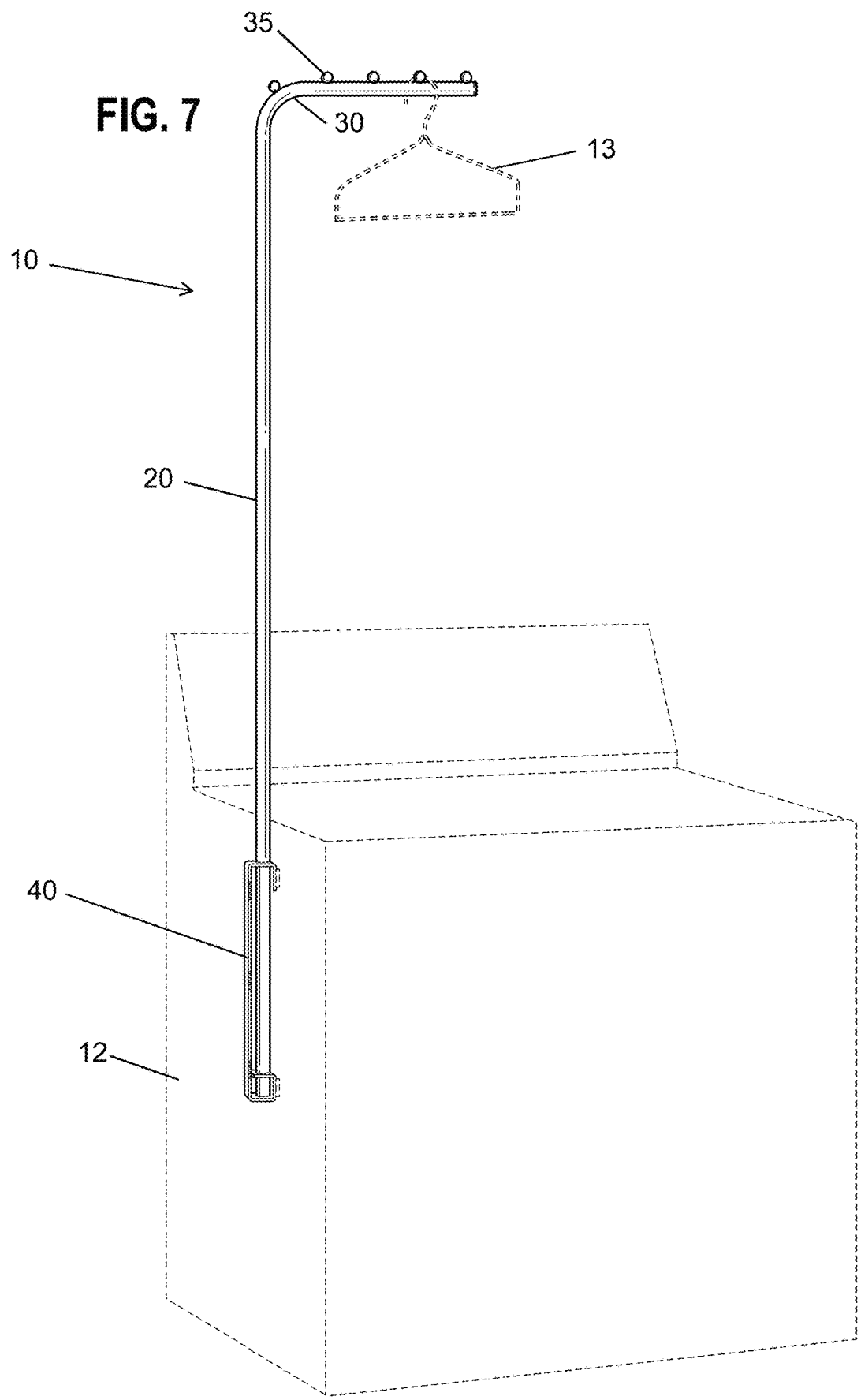
FIG. 7 shows the embodiment of FIG. 1 in use. In this Figure, the valet is attached to the side of a metallic washing machine.
Figure 8:
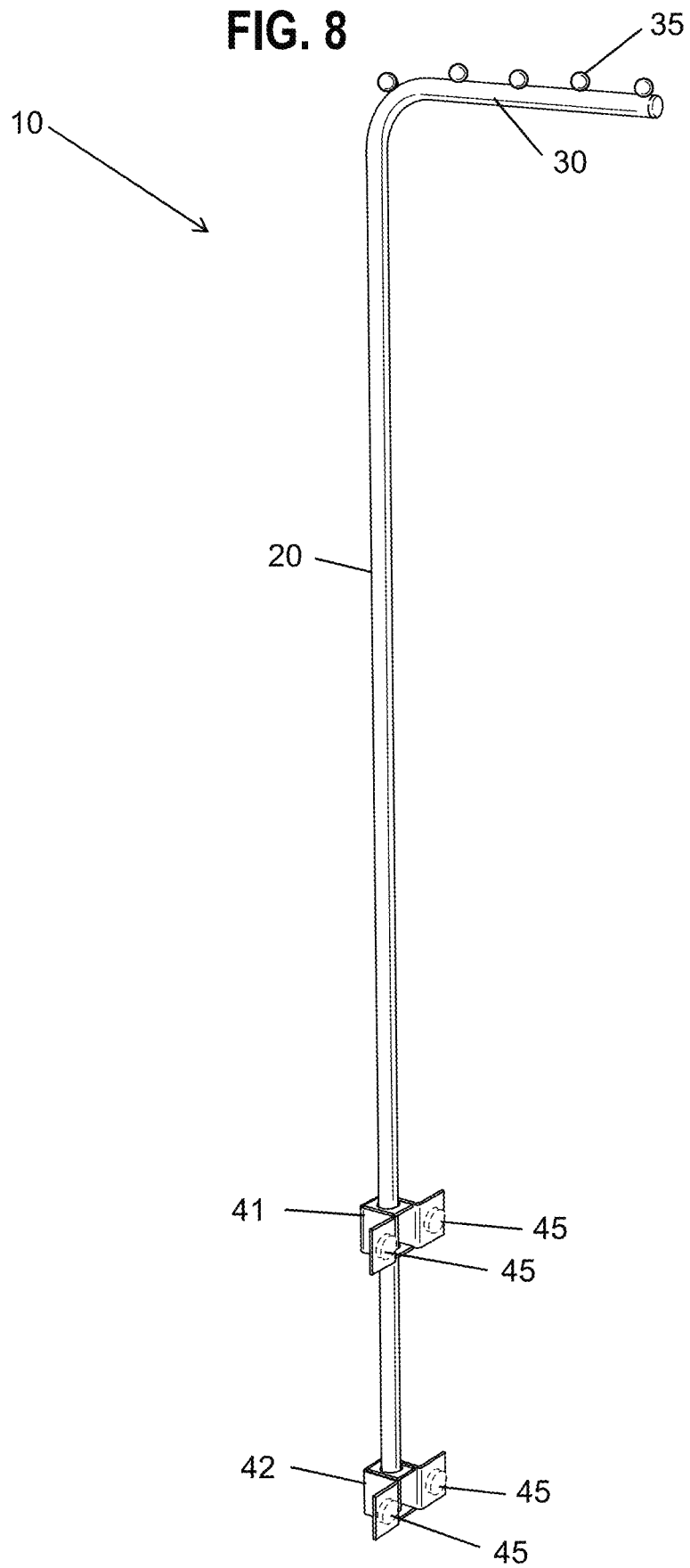
FIG. 8 shows an additional embodiment of the present invention. In this embodiment, there are multiple magnet assemblies. Shown here is an upper magnet assembly and a lower magnet assembly.
Figure 9:
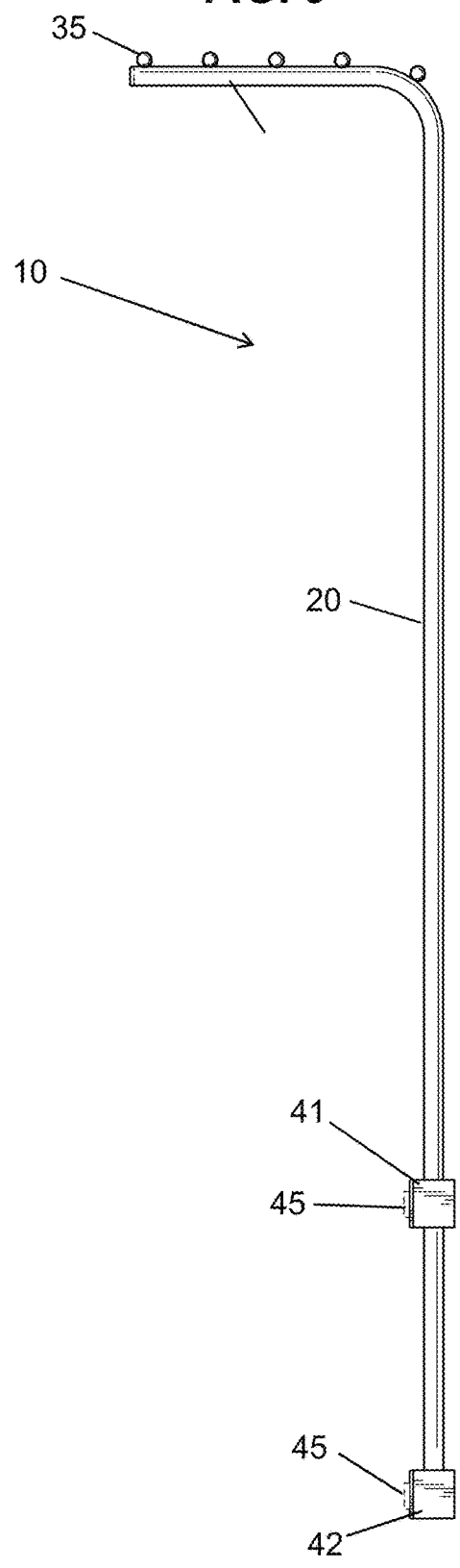
FIG. 9 shows a side view of the embodiment of FIG. 8.
Figure 10:
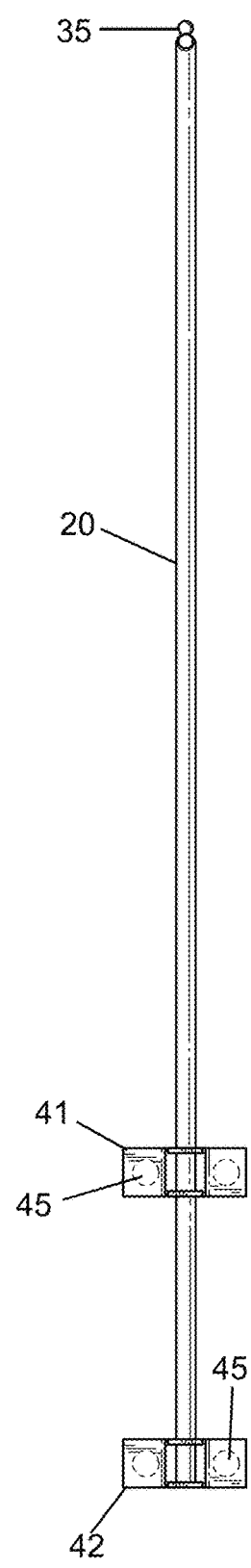
FIG. 10 shows a front view of the embodiment of FIG. 8. The side shown here is the side that would be facing toward a washer, dryer, or other metallic surface
Figure 11:
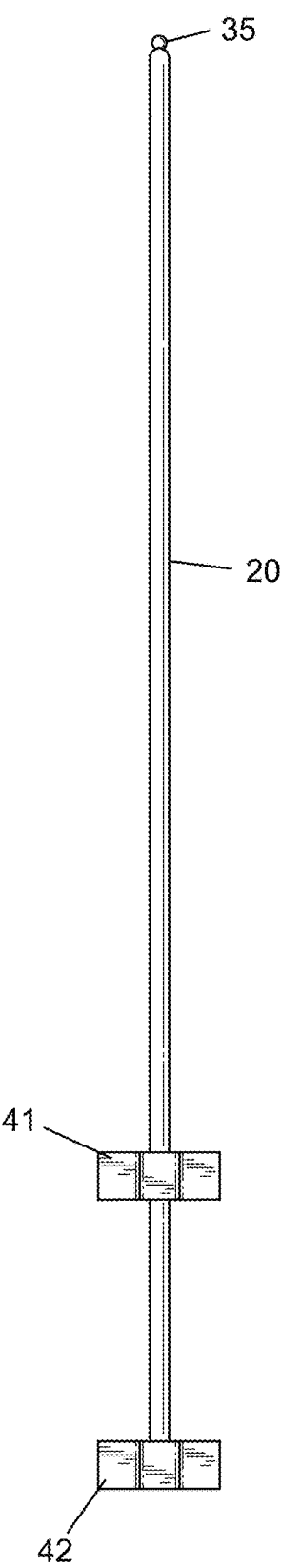
FIG. 11 shows a rear view of the embodiment of FIG. 8. The side shown here is the side that would be facing away from a washer, dryer, or other metallic surface.

FIG. 7 shows the valet 10 in use. Here, the rod 20 rests in and is secured by the magnet assembly 40. The magnet is adhered to the metallic wall of a washing machine 12. A hanger 13 is positioned between two hanger stops 35.

FIGS. 8-11 show a slightly different embodiment of the present invention. This embodiment may include the same support rod 20 and top arm 30. This embodiment has at least two magnet assemblies 41, 42 (two are shown in these figures). Here, one magnet assembly 42 is located near the bottom of the support rod 20. The other magnet assembly 41 is an "upper" magnet assembly located a distance from the "lower" assembly 42. In this embodiment, the magnet assemblies 41, 42 are brackets that attach to the rod 20 and extend perpendicularly from the rod 20. These assemblies include a magnet 45 on both sides of the rod. In aspects of the invention, the magnet assemblies 41, 42 are height adjustable along the length of the rod 20. The assemblies can be attached to the rod 20 by many different ways. In one embodiment, the assembly a screw can be used to tighten the assembly onto the rod. In other aspects, the assemblies attach to the rod in predetermined positions. For example, there can be a hold in the rod that matches with a corresponding hole in the assembly that receives a screw.

Additionally, the perpendicular length of the assembly can vary. For example, it can be lengthened, and more than one magnet 45 can be used on each side of the rod 20. The magnets can also be longer and larger across the length of the assembly.

Figure 12:
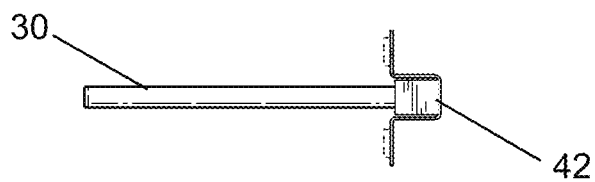
FIG. 12 shows a bottom view of the embodiment of FIG. 8.
Figure 13:
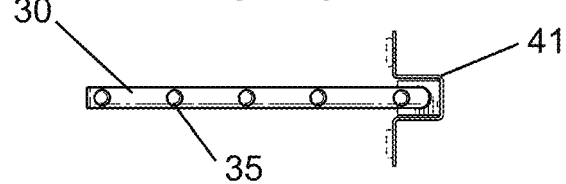
FIG. 13 shows a top view of the embodiment of FIG. 8.

FIGS. 12 and 13 show top and bottom views, respectfully, of an embodiment of the present invention. These view show an example of a length of the top arm, and an example of how multiple hanger stops can be positioned on the top arm to prevent excessive movement of hangers or other items along the top arm 30.

Figure 14:
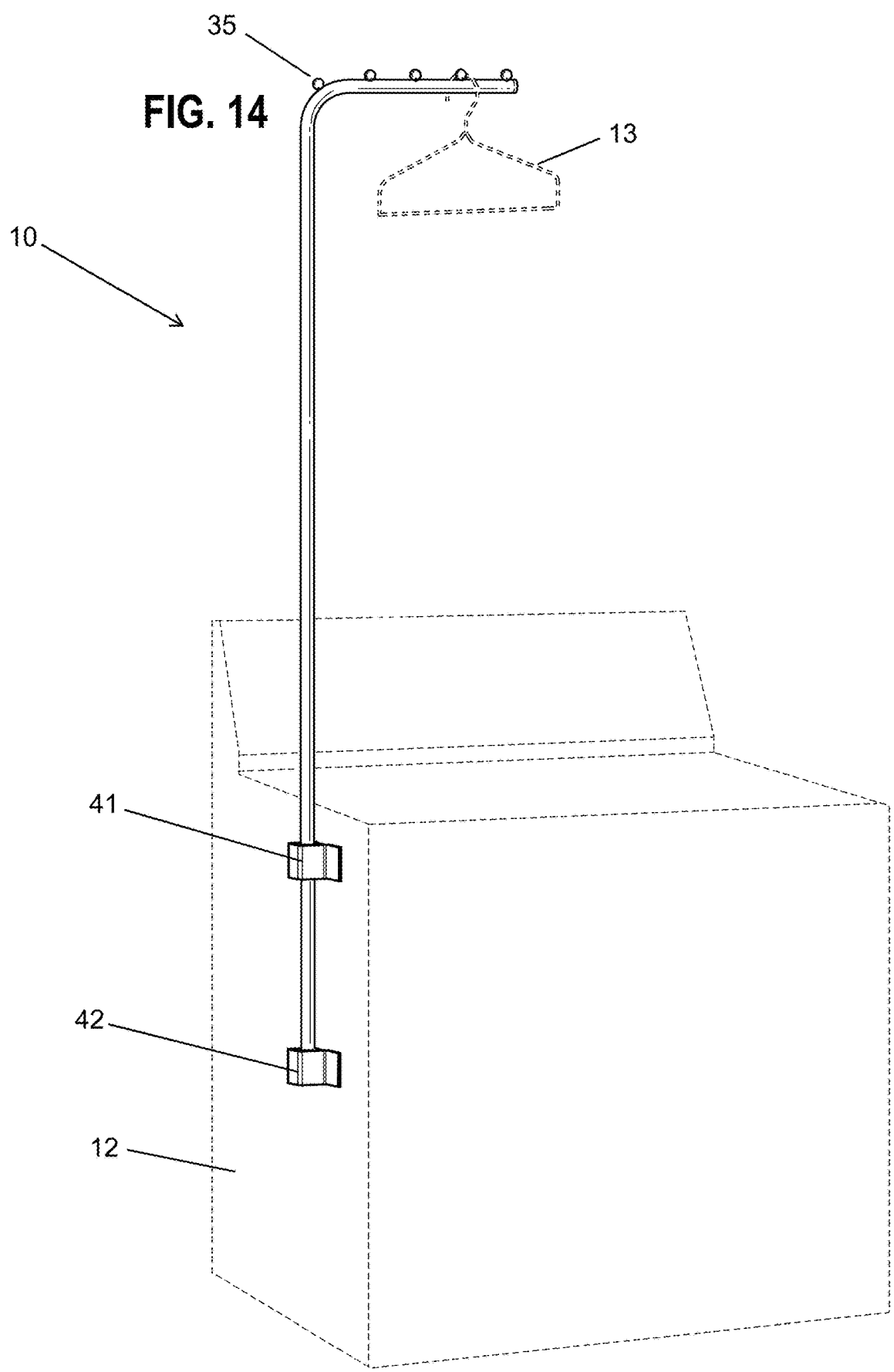
FIG. 14 shows the embodiment of FIG. 8 in use. In this Figure, the valet is attached to the side of a metallic washing machine.

FIG. 14 shows the valet 10 in use. Here, the rod 20 is held onto the appliance 12 surface by the magnet assemblies 41, and 42. As stated above, in aspects of the invention the magnet assemblies can be stationary or adjustable along the length of the rod 20 rests in and is secured by the magnet assembly 40. A hanger 13 is positioned between two hanger stops 35.

Figure 15:
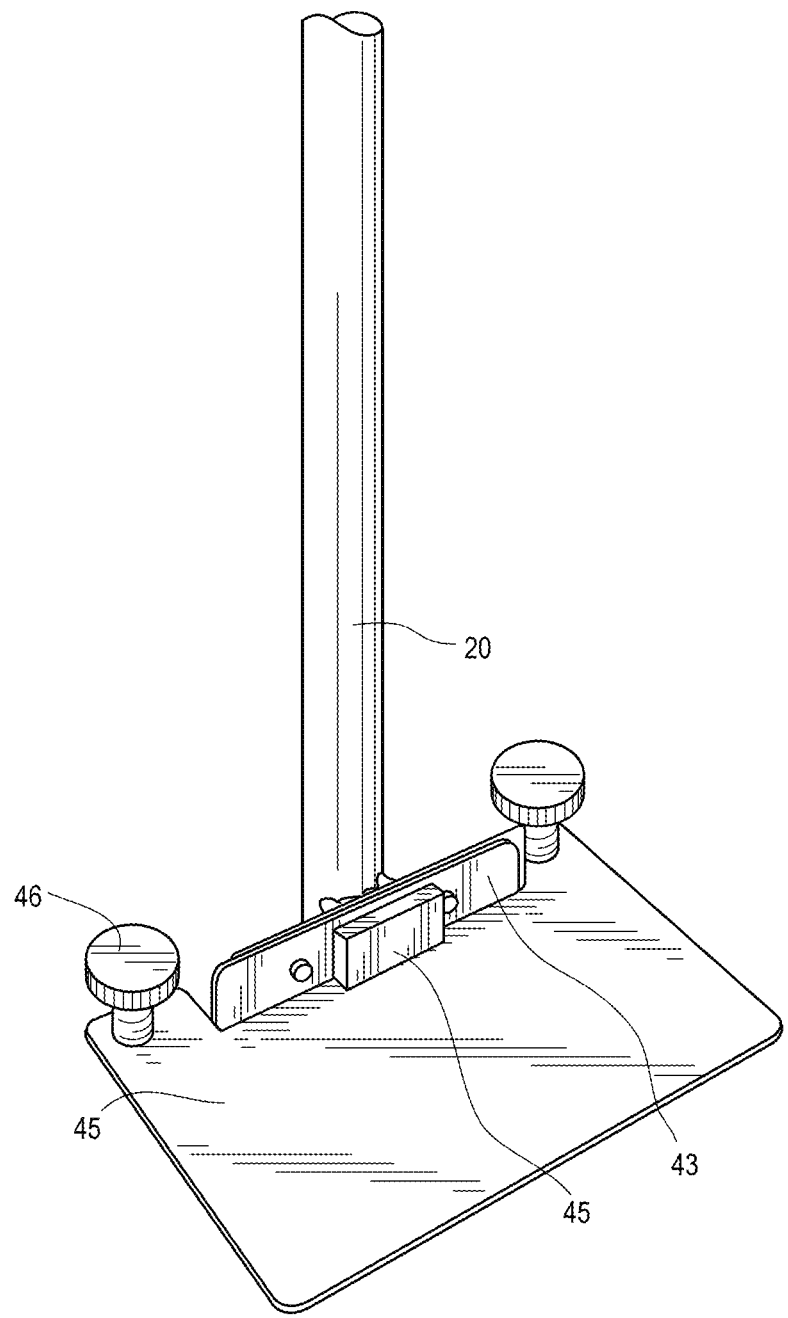
FIG. 15 shows an additional embodiment of the present invention. In this embodiment, the bottom magnet assembly includes a bottom brace that can be placed under the washer or dryer to improve stability.

FIG. 15 shows another embodiment of the present invention. In this embodiment, the lower magnet assembly 43 is modified. The assembly includes a bottom brace 45 and at least one leveler 46. The brace is designed to be placed under the appliance, creating more stability for the rod 20. The levelers 46 raise or lower the brace 45 to be flush with the bottom of the appliance. In one aspect of the invention, the levelers 46 are screws that are threaded into the brace.

Figure 16:
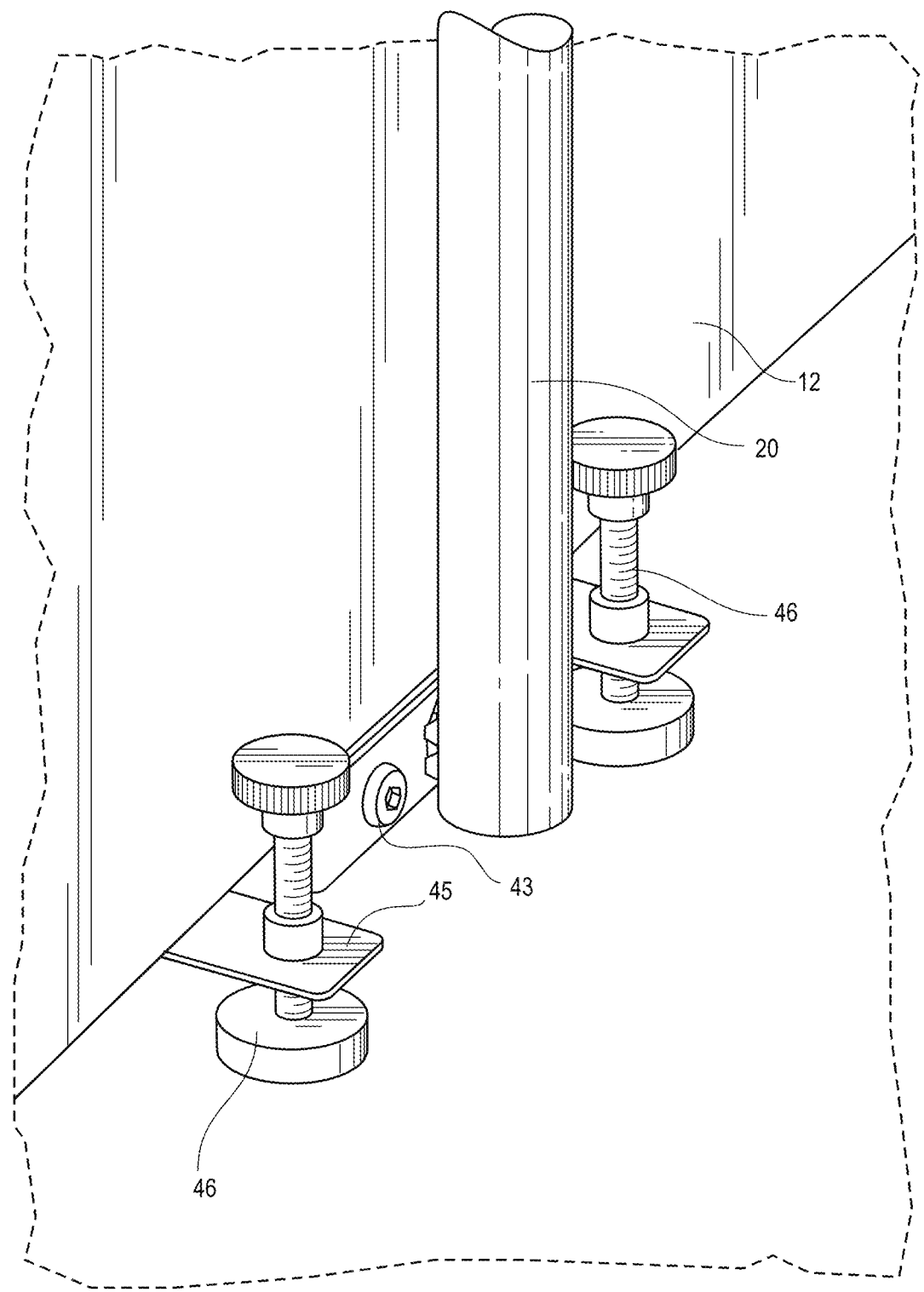
FIG. 16 shows the embodiment of FIG. 15, with the bottom brace in place under a washing machine.

FIG. 16 shows an example of the embodiment of FIG. 15 in use. The brace 45 is under the appliance 12. The levelers 46 are used to level the brace and to provide a snug fit under the appliance. The brace is engaged with the appliance by both at least one magnet and with the levelers. This embodiment provides a more secure platform for the arm and is better suited for heavier loads on the arm 20.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

It should also be noted that elements of embodiments may be described in reference to the description of a particular embodiment; however it is disclosed that elements of disclosed embodiments can be switched with corresponding elements of embodiments with the same name and/or number of other disclosed embodiments.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion.

I claim:

1. A storage device attachable to an appliance having a side metal surface and a bottom metal surface, comprising:
    an elongated support rod with a top end and a bottom end, the top end transitioning into a top arm, the top arm being perpendicular to the support rod;
    a first magnet assembly attached to the support rod and including at least one magnet for engaging the side surface of the appliance by magnetic attraction; and
    a bottom brace attached to the support rod for engaging the bottom and side surfaces of the appliance, the bottom brace including a hole on each side of the rod and a leveler received by each hole that raises and lowers the bottom brace to provide a snug fit against the bottom surface of the appliance.

2. The support device of claim 1, wherein the first magnet assembly is a bracket with two ends, the first end enclosing a first portion of the support rod, and a second end above the first end enclosing a second portion of the rod.

3. The support device of claim 1, wherein
    said first magnet assembly being a bracket enclosing a portion of the support rod, and extending perpendicularly from the rod, and including a magnet on each side of the support rod;
    said bottom brace included a second magnet assembly engaging the side surface of the appliance.

4. The support device of claim 1, wherein the support rod is tubular and metallic.

5. The device of claim 1, wherein the top arm can swivel around the top of the support rod.

6. The device of claim 1, wherein the top arm comprises at least two protrusions on the top arm.

7. The device of claim 1, where each leveler acts independently of one another when raising and lowering the bottom brace.

8. The device of claim 1, wherein each hole on the bottom brace is threaded and each leveler is a screw.

9. The device of claim 1, wherein each leveler is threaded and includes a knob and a foot.

\* \* \* \* \*